Feb. 26, 1957  W. H. McCORMACK  2,782,995
ELECTRONIC TEMPERATURE CONTROL CIRCUIT
Filed Nov. 9, 1953  2 Sheets-Sheet 2
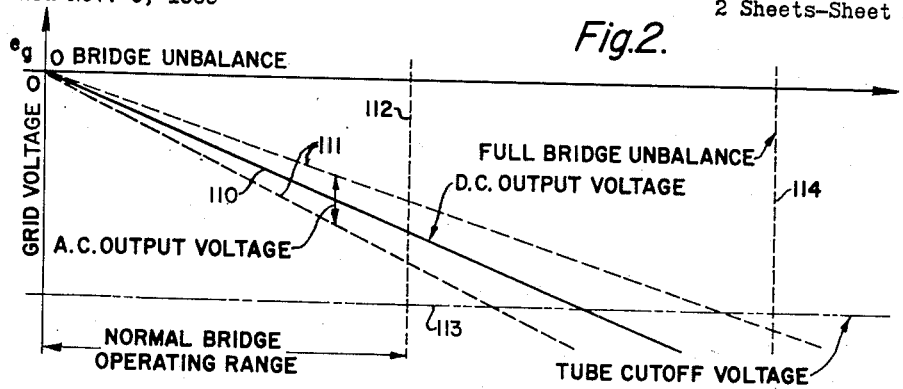
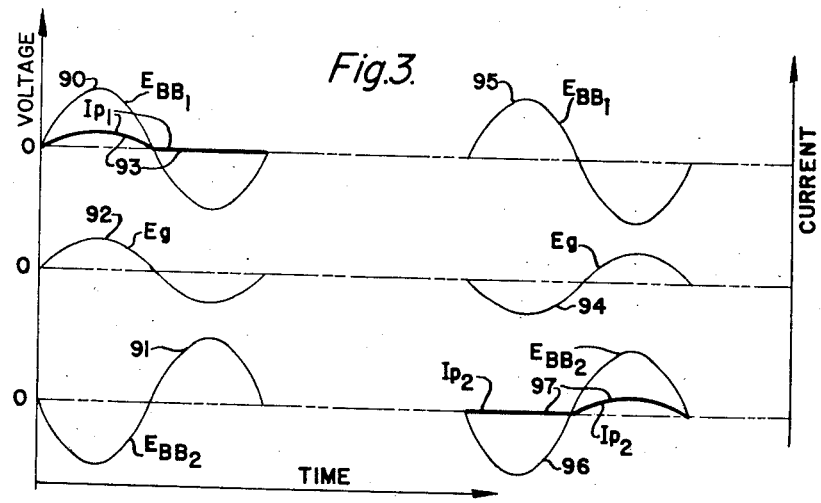
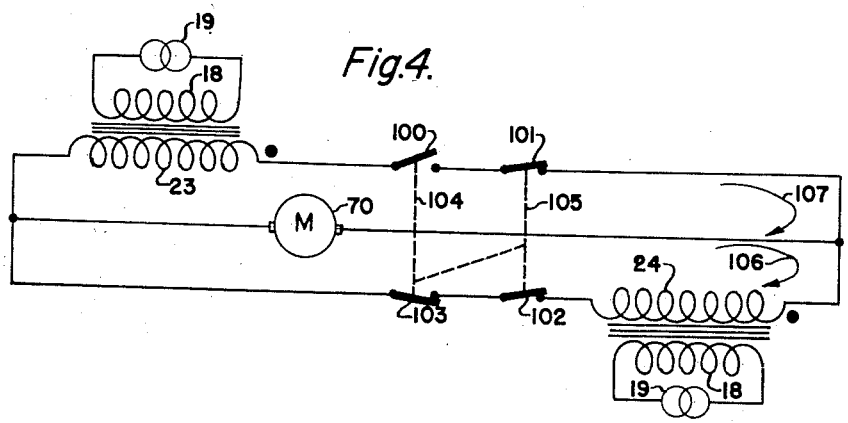
WILLIAM H. MCCORMACK,
INVENTOR.
BY United States Patent Office 2,782,995
Patented Feb. 26, 1957

2,782,995

ELECTRONIC TEMPERATURE CONTROL CIRCUIT

William H. McCormack, Torrance, Calif., assignor to The Garrett Corporation, Los Angeles, Calif., a corporation of California Application November 9, 1953, Serial No. 391,060

14 Claims. (Cl. 236—78)

This invention relates generally to electronic control systems, and particularly relates to a temperature control circuit having fail-safe features.

The control system of the present invention is particularly adapted for use in controlling the temperature of a medium, such as a glass windshield having a transparent, electrically conductive coating. It is, however, to be understood that the control system of the invention may be applied to other uses which will readily occur to those skilled in the art.

In a proportional control system it is conventional practice to provide a bridge network having one arm, the impedance of which may be set to a desired value while the impedance of another arm is responsive to a characteristic of the medium to be controlled. The control circuit of the present invention includes such a bridge network which is designed to provide fail-safe operation in case of failure of the network. Furthermore, the control system of the present invention includes a reversible direct current motor which is controlled by an error signal developed by the bridge network to control, for example, the temperature of a windshield. The electric control circuit included in the system of the present invention automatically returns the motor to a predetermined position in case of failure of the bridge network. This will prevent cracking of the glass of the windshield in case of such failure by returning the temperature control automatically to a predetermined lower limit.

It is accordingly an object of the present invention to provide an improved electronic control system including a bridge network which is fail-safe in case one of the elements or bridge arms becomes short circuited or is opened.

Another object of the invention is to provide an improved electronic motor control circuit for controlling the direction of rotation of a reversible direct current motor and which will automatically return the motor to a predetermined position in the absence of a control signal.

A further object of the invention is to provide an improved electronic temperature control system particularly adapted for controlling the temperature of a windshield without damaging the windshield by sudden overheating thereof.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 2 is a graph of the grid voltage plotted as a function of bridge unbalance which will be referred to in explaining the operation of the fail-safe bridge circuit forming part of the system of Fig. 1;

Fig. 3 is a graph of plate voltages, currents and grid voltages under various operating conditions of the electric motor control circuit included in the system of Fig. 1; and Fig. 4 is an equivalent diagram of the motor control circuit forming part of the system of Fig. 1.

Figure 1:
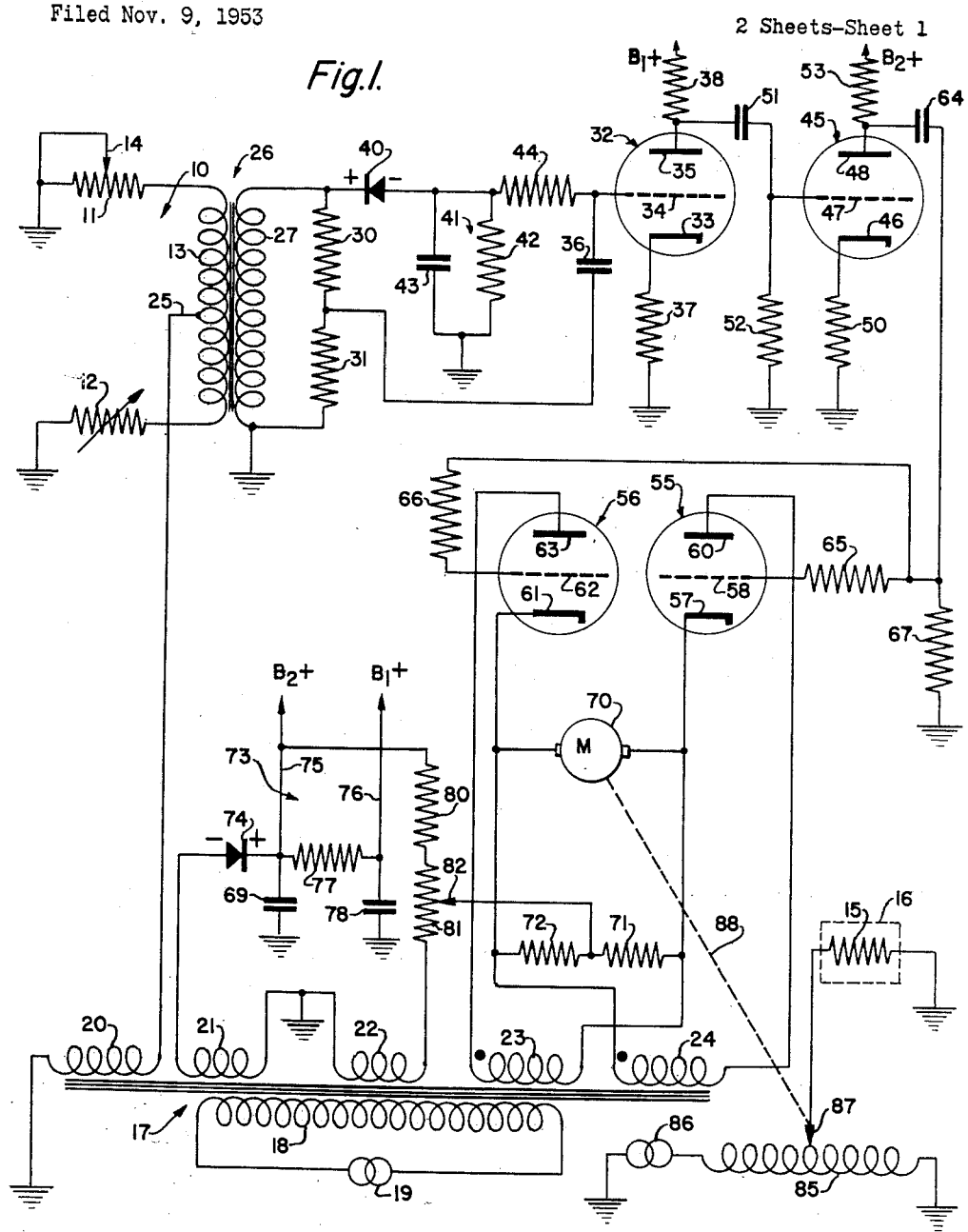
Fig. 1 is a circuit diagram of an electronic temperature control system embodying the present invention.

Referring now to the drawings in which like elements are designated by the same reference characters and particularly to Fig. 1, there is illustrated an electronic control system including a bridge network generally indicated at 10. This bridge network 10 includes two resistors 11, 12 and an inductor 13 connected to form a closed loop. Preferably the junction point of resistors 11, 12 is grounded as shown. Resistor 11 includes a grounded variable tap 14 which may be manually set to a predetermined value. Resistor 12 is variable as indicated and preferably its resistance is representative of the temperature of the medium to be controlled as explained above. The temperature control circuit of the invention may be used for controlling the temperature of a glass windshield which may, for example, consist of "Nesa" glass having a transparent, electrically conductive layer. By passing an electric current of controllable magnitude through the conductive layer, the temperature of the glass windshield may be controlled. This conductive layer is shown schematically at 15, while the dotted block 16 indicates schematically the glass windshield.

An alternating current is supplied between the midpoint of the inductor 13 and the junction point of resistors 11, 12 which is grounded. This may, for example, be accomplished by means of a transformer 17 having a primary winding 18 and a number of secondary windings 20, 21, 22, 23, 24 which will be referred to hereinafter. A suitable alternating current source schematically indicated at 19 is connected across primary winding 18. The secondary winding 20 has one terminal grounded, that is, connected to the junction point of resistors 11, 12 while its other terminal is connected to the midpoint of inductor 13 by tap 25. Inductor 13 may form the primary winding of a transformer 26 having a secondary winding 27 which forms part of the bridge output circuit. One terminal of secondary winding 27 may be grounded as shown, while a voltage divider which may consist of resistors 30, 31 is connected across the secondary winding 27.

The bridge output circuit feeds into a first or preamplifier stage including an amplifier tube 32 such, for example, as a triode. The triode 32 has a cathode 33, a control grid 34, and an anode 35. In accordance with the present invention there is provided an alternating current connection including a coupling capacitor 36 between the bridge output circuit and triode 32. To this end the coupling capacitor 36 is connected between the junction point of resistors 30, 31 and control grid 34. An unbypassed cathode resistor 37 is connected between cathode 33 and ground while the anode 35 is connected to a suitable anode voltage supply indicated at $B_1+$ through an anode load resistor 38.

It will now be seen that as long as the bridge network 10 is balanced, there will be no alternating current across secondary winding 27 and accordingly, no alternating current signal is impressed on the control grid 34.

In accordance with the present invention, there is further provided a direct current connection between the bridge output circuit and the triode 32. This direct current connection includes a suitable rectifier 40 which may for example be a crystal rectifier as shown. The rectifier 40 is followed by a rectifier output circuit 41 including a resistor 42 and a capacitor 43 connected in parallel between rectifier 40 and ground. The rectifier voltage is impressed on control grid 34 through isolating resistor 44 which isolates the direct current and alternating current connections. Rectifier 40 is poled so that a negative voltage is impressed on control grid 34 which tends to cut off the pre-amplifier.

The pre-amplifier is followed by a second or final amplifier stage which may include another triode 45 having a cathode 46, a control grid 47 and an anode 48. The amplifier 45 generally resembles the amplifier 32 and its cathode is grounded through an unbypassed cathode resistor 50. Anode 35 is coupled to control grid 47 through a coupling capacitor 51 and the control grid 47 is grounded through a grid leak resistor 52. The anode 48 is connected to another voltage supply indicated at $B_2+$ through anode load resistor 53.

The amplified control or error signal developed across anode load resistor 53 is now impressed on a pair of motor control tubes indicated at 55 and 56 which may also be triodes as shown. Triode 55 has a cathode 57, a control grid 58 and an anode 60 while triode 56 has a cathode 61, a control grid 62 and an anode 63. The control signal is impressed through coupling capacitor 64 on both control grids 58, 62 through respective isolating resistors 65 and 66. The junction point of coupling capacitor 64 and isolating resistors 65, 66 is grounded through a grid leak resistor 67.

Each of the triodes 55 and 56 is energized by a separate alternating current source. This is accomplished by cross connecting the terminals of the secondary windings 23, 24 to the anode of one of the triodes 55, 56 and to the cathode of the other. Thus the left hand terminal of secondary winding 23 is connected to anode 63 and its right hand terminal to the cathode 57. Similarly, the right hand terminal of the secondary winding 24 is connected to the anode 60 and its left hand terminal to the cathode 61. As indicated by the dots on the secondary windings 23, 24 they are wound in such a manner that the anodes 60 and 63 are supplied by alternating voltages which are out of phase.

A reversible direct current motor 70 has its two terminals connected directly to the cathodes 57 and 61. Accordingly, the direction of flow of the current through motor 70 controls its direction of rotation.

In accordance with the present invention, both a direct current and an alternating current bias voltage are applied to the cathodes 57, 61, that is, between the cathodes and the control grids. To this end two resistors 71, 72 are connected in series between the cathodes 57, 61 respectively. Preferably, the direct current bias voltage for the cathodes 57, 61 and the anode voltages for amplifier 32 and 45 is supplied by a rectifier and filter circuit generally indicated at 73. The rectifier circuit includes the secondary winding 21 having one terminal grounded while the other terminal is connected to a rectifier 74 which may be a crystal rectifier as shown. The rectifier is poled to develop a positive output voltage at the output lead 75 which is bypassed to ground through filter capacitor 69. The anode voltage $B_2+$ may be obtained from lead 75 as shown. The anode voltage $B_1+$ may be obtained from a lead 76 and this voltage is further filtered through filter resistor 77 and bypassed to ground through filter capacitor 78.

The direct current bias voltage applied to the cathodes 57, 61 may be obtained from lead 75 through a voltage divider including resistors 80 and 81 connected in series, the latter being grounded through the secondary winding 22. The direct current bias voltage is obtained by means of a variable tap 82 on resistor 81, and connected to the junction point of resistors 71, 72 thereby to impress a positive voltage on the cathodes 57, 61. Through the secondary winding 22 and the lower portion of resistor 81 an alternating voltage is also impressed on the cathodes 57, 61 through resistors 71, 72 respectively. The direct current bias voltage applied to the cathodes 57, 61 of the triodes 55, 56 is such as to decrease the residual conduction of the triodes in the absence of the control signal. At the same time, an alternating current is impressed through the secondary winding 22 on the two cathodes of the motor control tubes so as to render one of them conductive in a manner which will be explained hereinafter.

The electric motor 70 may, for example, control the current which is permitted to flow through the resistor 15 which may represent the conductive coating of the windshield glass. To this end an alternating current is impressed across an inductor 85 by an alternating current source schematically indicated at 86. The free terminals of the inductor 85 and of the source 86 may be grounded as shown. The variable tap 87 on the inductor 85 is connected to one terminal of the resistor 15 while the other resistor terminal is grounded as shown. The variable tap 87 is connected to the motor 70 to be moved thereby as indicated schematically by dotted line 88. Hence rotation of the electric motor 70 will control the position of the variable tap 87 and thus the magnitude of the current which is permitted to flow through the resistor 15.

The operation of the electronic control circuit of Fig. 1 will now be explained. As stated previously, as long as the bridge network 10 is balanced, no voltage is developed at the ungrounded terminal of the secondary winding 27. Let it now be assumed that the bridge network becomes unbalanced by moving, for example, manually the variable tap 14 of resistor 11. In that case, an alternating voltage will be developed across the secondary winding 27 and its phase depends on the direction of unbalance of the bridge network. A predetermined portion of this alternating current control signal, which may be called an error signal, is impressed on control grid 34 of the pre-amplifier through coupling capacitor 36. At the same time, the alternating current control signal is rectified by rectifier 40 and a corresponding negative bias voltage is also impressed on the control grid 34 through isolating resistor 44.

The error signal is amplified by the pre-amplifier 32 and the second amplifier stage 45 in a conventional manner and the amplified error signal is impressed simultaneously on both control grids 58 and 62 of the motor control tubes.

The effect of the error signal on the motor control tubes 55, 56 will now be explained by means of Fig. 3 to which reference is made. Curve 90 of Fig. 3 indicates the voltage of, for example, anode 60 of tube 55 which is identified by $E_{BB1}$ while curve 91 indicates the voltage of the other anode 63 identified by $E_{BB2}$. Curve 92 indicates the grid voltage $E_g$ which is simultaneously impressed on the two control grids 58 and 62 and which represents the error signal developed in response to unbalance of the bridge network in one direction. It will now be seen that during the positive half cycle of the grid voltage $E_g$ only the tube 55 has a positive plate voltage as shown by curve 90. The other tube 56 has a negative plate voltage as indicated by curve 91. Hence only the tube 55 will conduct plate current as shown by curve 93 which is identified by $I_{p1}$. During the negative half cycle of the grid voltage neither tube 55 nor tube 56 will be able to conduct space current, and the plate current $I_{p1}$ of tube 55 is shown by curve 93.

The current conduction through tube 55 may be traced from the right hand terminal of inductor 24 through anode 60, cathode 57, motor 70 and back to the left hand terminal of the inductor. Consequently, motor 70 will be driven intermittently once during each grid voltage cycle to rotate in a predetermined direction. Accordingly, tap 87 is moved by motor 70 in a direction to change the current flow through resistor 15 which will change the temperature of the windshield. This changed temperature is sensed by the resistor 12 and the temperature adjustment continues until the resistance of resistor 12 again equals that of resistor 11.

Let it now be assumed that variable tap 14 of resistor 11 is adjusted to cause an unbalance of the bridge network in the opposite direction. In this case, the phase of the error signal will be opposite to that of the error signal developed under the previous condition as shown by curve 94 of Fig. 3, wherein curves 95 and 96 again indicate the plate voltages of tubes 55, 56 respectively. It will now be seen that during the initial negative half cycle of the grid voltage neither one of the tubes will be able to conduct. However, during the following half cycle of the grid voltage shown by curve portion 94, the plate voltage of tube 56 will be positive so as to permit conduction thereof. The resulting plate current is shown by curve 97 and is identified by $I_{p2}$. Consequently, depending on unbalance of the bridge network, either tube 55 or tube 56 will conduct during alternate half cycles of the grid voltage.

Under the condition last described, tube 56 conducts current intermittently. Thus current flow may be traced from the left hand terminal of inductor 23 through anode 63, cathode 61, motor 70 and back to the right hand terminal of the inductor. Consequently, current now flows intermittently in the opposite direction through motor 70 thus moving variable tap 87 in the opposite direction to change the current flow through resistor 15. The resulting temperature change continues until the bridge network is balanced again.

The current conduction through the motor 70 will be more readily understood by reference to Fig. 4 which shows an equivalent circuit diagram of the motor control circuit. The inductors 23, 24 are shown connected in a closed loop through four switches 100, 101, 102 and 103. The motor 70 is connected between the two inductors as shown to form a separate closed loop with each inductor. Each of the inductors 23, 24 is separately energized through the primary winding 18 and its source 19 as shown schematically. Switch 100 represents the anode 63 of the tube 56, while switch 101 represents its control grid 62. Similarly switch 103 represents the anode 60 of tube 55 and switch 102 indicates the control grid 58.

Assuming now the conditions shown on the left hand side of Fig. 3, it will be seen that the grid voltage shown by curve 92 is positive during the first half cycle and is applied in phase to both control grids which would render both tubes in a condition to conduct. This is represented by switches 101 and 102 which are both shown closed. At the same time, only the plate voltage of tube 55 is positive (curve 90) while the plate voltage of tube 56 is negative (curve 91). Thus tube 55 is in a position to conduct, while tube 56 is not. This is shown schematically by switch 103 which is closed while switch 100 is open. During successive half cycles of the control signal the switches 100, 103 and 101, 102 are moved in unison as indicated schematically at 104 and 105. Consequently, during a positive half cycle, current is permitted to flow as shown by the arrow 106 from inductor 24 through motor 70 and back to the inductor. At the same time, since switch 100 is open, there is no current flow through inductor 23. During the next half cycle, all switches except switch 100 are open and hence there is no current flow through either inductor.

During the conditions shown on the right-hand half of Fig. 3, the phase of the grid voltage with respect to those of the plate voltages is reversed as described hereinbefore. This may be represented in the diagram of Fig. 4 by moving switchs 100 and 103 into their opposite positions so that switch 103 is open and switch 100 is closed. Accordingly, current now flows as shown by the arrow 107 through inductor 23 and motor 70. During the next half cycle, all switches are open except switch 103 and hence there is no current flow through either inductor. Thus the currents represented by arrows 106 and 107 flow through motor 70 in opposite directions driving it in opposite directions of rotation.

A motor control circuit of the type shown in Fig. 1 without an alternating current bias voltage has been disclosed and claimed in the co-pending application to McCormack and Olson entitled "Motor Control Circuit," Serial No. 390,824, and filed concurrently herewith.

So far the normal operation of the control system of the invention has been explained. Let it now be assumed that the bridge network 10 becomes completely unbalanced, due to either short circuiting or to opening of one of the bridge arms. In that case, a large alternating current signal is developed at the ungrounded terminal of the secondary winding 27. As a result, a large negative bias voltage is impressed through rectifier 40 and isolating resistor 44 on the control grid 34 of the pre-amplifier 32, thereby to cut off the amplifier. This may be better understood by reference to Fig. 2. In Fig. 2, curve 110 which is a straight line indicates the direct current voltage developed by the rectifier network including rectifier 40 and impressed on the control grid of the pre-amplifier as a function of bridge unbalance. Two diverging lines 111 indicate the alternating current voltage developed by the bridge network and impressed on the pre-amplifier control grid through the alternating current connection including coupling capacitor 36.

As indicated in Fig. 2, the normal bridge operating range is between the vertical zero and a vertical dotted line 112. Under such conditions both the direct and alternating current output voltages are above the tube cutoff voltage shown by a horizontal dotted line 113. However, when the bridge becomes fully unbalanced, due to failure thereof, both the direct and alternating current voltages are below the cutoff voltage line 113, because the bridge output voltages extend beyond the vertical line 114 indicated full bridge unbalance. Thus the bridge network is fail-safe because the pre-amplifier is cut off.

The pre-amplifier 32 and the final amplifier stage 45 also provide fail-safe operation. If either of these amplifiers fails to conduct, for example, if its filament becomes opened or if there should be a short circuit in the tube, there will be no output signal which could be impressed on the motor control tubes 55, 56.

It will also be noted that the anode voltage $B_1+$ is specially filtered. Accordingly, since the anode voltage $B_1+$ is applied to the pre-amplifier 32 this will prevent development of any output signal across the anode resistor 38 of the pre-amplifier. On the other hand, the anode voltage $B_2+$ need not be filtered quite as well. This anode voltage $B_2+$ which is less filtered is utilized to impress a direct current bias voltage through voltage divider 80, 81, variable tap 82 and cathode resistors 71, 72 on the motor control amplifiers. Special filtering of the direct current bias voltage is not necessary because an alternating current bias voltage is also impressed on the cathodes of the motor control tubes through the secondary winding 22.

Upon failure of the bridge circuit or of one or both of the amplifiers 32 and 45 no control signal is applied to the motor control tubes 55 and 56. However, the alternating current bias voltage applied to cathodes 57 and 61 by winding 22 will render one of the tubes conductive depending upon the phase of the voltage applied to the cathodes with respect to that applied to their anodes through the secondary windings 23, 24. The effect of the alternating current bias voltage applied to the cathode is substantially the same as previously explained in connection with Fig. 3. Hence, one of the tubes such, for example, as tube 55 is rendered conductive during successive half cycles of the alternating cathode bias voltage.

This in turn will cause motor 70 to rotate in a predetermined direction, thereby to return the tap 87 to a predetermined position such, for example, as towards the right of inductor 85. Consequently, the current flowing through resistor 15 is either reduced to a small value or to zero to prevent heating of the windshield. Preferably, the motor 70 is automatically cut off by a limit switch or by a suitable clutch to limit the movement of the movable tap 87. Consequently, upon failure of the bridge circuit or of the pre-amplifier or final amplifier stage, the temperature of the windshield will be reduced to provide fail-safe operation and to prevent cracking of the windshield by overheating. It will be understood that in normal operation, the bridge network will be slightly unbalanced to compensate for the alternating current bias voltage impressed on the cathodes of the motor control tubes.

The electronic control system of the present invention thus includes a bridge network having fail-safe operation. Furthermore, in the absence of a control signal due to failure of the bridge network, or one of the amplifier stages, the control motor automatically returns to a predetermined position.

What is claimed is:

1. In an electronic control system, a bridge network having four arms, individual impedance elements in each of said arms, means for applying an alternating current across a first pair of opposed junction points of said elements, a bridge output circuit coupled to the other pair of opposed junction points of said elements, control means for changing the impedance of at least one of said elements, an amplifier having input and output electrodes, an alternating current circuit connected between said bridge output circuit and said input electrodes for impressing on said input electrodes an alternating current signal representative of the unbalance of said bridge network, and a direct current connection between said bridge output circuit and said input electrodes and including a rectifier for impressing a direct current voltage on said input electrodes, said rectifier being poled so that said direct current voltage tends to render said amplifier inoperative, whereby unbalance of said bridge network due to short circuiting of one of said elements or due to opening of one of said arms will render said amplifier inoperative to provide fail-safe operation of said control system.

2. In an electronic control system, a bridge network having four arms, two impedance elements providing two of said arms, an inductor providing the remaining two of said arms, means for applying an alternating current between the junction point of said elements and the midpoint of said inductor, a bridge output circuit coupled across said inductor, control means for changing the impedance of at least one of said elements, an amplifier having input and output electrodes, an alternating current circuit connection between said bridge output circuit and said input electrodes for impressing on said input electrodes an alternating current signal representative of the unbalance of said bridge network, and a direct current connection between said bridge output circuit and said input electrodes and including a rectifier for impressing a direct current voltage on said input electrodes, said rectifier being poled so that said direct current voltage tends to render said amplifier inoperative, whereby unbalance of said bridge network due to short circuiting or due to opening of one of said arms will render said amplifier inoperative to provide fail-safe operation of said control system.

3. In an electronic control system, a bridge network having four arms, two resistive impedance elements providing two of said arms, an inductor providing the other two of said arms, means for applying an alternating current between the junction point of said elements and the midpoint of said inductor, a bridge output circuit coupled across said inductor, control means for changing the resistance of at least one of said elements, an amplifier having input and output electrodes, an alternating current circuit connection between said bridge output circuit and said input electrodes for impressing on said input electrodes an alternating current signal representative of the unbalance of said bridge network, and a direct current connection between said bridge output circuit and said input electrodes and including a rectifier for impressing a direct current voltage on said input electrodes, said rectifier being poled so that said direct current voltage tends to render said amplifier inoperative, whereby unbalance of said bridge network due to short circuiting or due to opening of one of said arms will render said amplifier inoperative to provide fail-safe operation of said control system.

4. In an electronic control circuit, a transformer having a primary and a secondary winding, two impedance elements, said primary winding and said impedance elements being connected in a closed loop, means for applying an alternating current between the junction point of said impedance elements and the midpoint of said primary winding, control means for changing the impedances of said impedance elements, a voltage divider connected across said secondary winding, an electron tube having a control grid, a cathode and an anode, a first circuit connection between one terminal of said secondary winding and said cathode, a second alternating current connection between an intermediate point of said voltage divider and said control grid, and a rectifier circuit connected between the other terminal of said secondary winding and said control grid and forming a direct current connection therebetween, said rectifier being poled to impress a direct current voltage on said control grid that is negative with respect to that of said cathode.

5. In an electronic control circuit, a transformer having a primary and a secondary winding, two resistors, said primary winding and said resistors being connected in a closed loop, means for applying an alternating current between the junction point of said resistors and the midpoint of said primary winding, control means for changing the resistance of said resistors, a potentiometer connected across said secondary winding, an electron tube having a control grid, a cathode and an anode, a first circuit connection between one terminal of said secondary winding and said cathode, a second alternating current connection between an intermediate point of said potentiometer and said control grid, a rectifier circuit connected between the other terminal of said secondary winding and said control grid and forming a direct current connection therebetween, said rectifier being poled to impress a direct current voltage on said control grid that is negative with respect to that of said cathode, and a utilizing circuit coupled to said anode.

6. In an electronic control circuit, a transformer having a primary and a secondary winding, a first and a second resistor, said primary winding and said resistors being connected in a closed loop, means for applying an alternating current between the junction point of said resistors and the midpoint of said primary winding, control means for changing the resistance of said resistors, a third resistor connected across said secondary winding, an electron tube having a control grid, a cathode and an anode, a first circuit connection between one terminal of said secondary winding and said cathode, a second alternating current connection between an intermediate point of said third resistor and said control grid, a rectifier circuit connected between the other terminal of said secondary winding and said control grid and forming a direct current connection therebetween, said rectifier being poled to impress a direct current voltage on said control grid that is negative with respect to that of said cathode, and a utilizing circuit coupled to said anode.

7. In an electronic motor control circuit, a direct current motor, two electron discharge tubes, each having a cathode, a control grid and an anode, means for impressing an alternating current control signal on said control grids, a first and a second inductor, each having its terminals connected respectively to the anode of one tube and to the cathode of the other tube, said motor being connected between said cathodes, means for applying alternating current across said inductors, and means for applying direct current and alternating bias voltages simultaneously between the cathodes and control grids of both of said tubes, whereby the magnitude and direction of the current flowing through said motor is determined by the magnitude of said control signal and by its phase with respect to said alternating current applied to said anodes, and whereby said alternating current bias voltage causes a predetermined one of said tubes to conduct in the absence of said control signal, thereby to rotate said motor in a predetermined direction.

8. In an electronic motor control circuit, a direct current motor, two electron discharge tubes, each having a cathode, a control grid and an anode, means for impressing an alternating current control signal simultaneously on both of said control grids, a first and a second inductor, each having its terminals connected respectively to the anode of one tube and to the cathode of the other tube, said motor being connected between said cathodes, means for applying alternating current across said inductors in such a sense that the voltages applied to the anodes of said tubes are out of phase, and means for applying direct current and alternating current bias voltages simultaneously between the cathodes and control grids of both of said tubes, whereby the magnitude and direction of the current flowing through said motor is determined by the magnitude of said control signal and by its phase with respect to said alternating current applied across said inductors, and whereby said alternating current bias voltage causes a predetermined one of said tubes to conduct in the absence of said control signal, thereby to rotate said motor in a predetermined direction.

9. In an electronic motor control circuit, a direct current motor, two electron discharge tubes, each having a cathode, a control grid and an anode, a first pair of resistors, each having one terminal connected to the control grid of one of said tubes, means for impressing an alternating current control signal between the other terminals of said first pair of resistors and a point of reference potential, a first and a second inductor, each having its terminals connected respectively to the anode of one tube and to the cathode of the other tube, said motor being connected between said cathodes, means for applying alternating current across said inductors in such a sense that the voltages applied to the anodes of said tubes are out of phase, a second pair of resistors connected serially between said cathodes, and means for applying direct current and alternating current bias voltages between the junction point of said second pair of resistors and said point of reference potential, whereby the magnitude and direction of the current flowing through said motor is determined by the magnitude of said control signal and by its phase with respect to said alternating current applied across said inductors, and whereby said alternating current bias voltage causes a predetermined one of said tubes to conduct in the absence of said control signal, thereby to rotate said motor in a predetermined direction.

10. An electronic temperature control system comprising four impedance elements connected to form a bridge network, manually operable means for adjusting the impedance of one of said elements, the impedance of another one of said elements being responsive to the temperature of a medium to be controlled, means for applying an alternating current between a first pair of opposed junction points of said elements, a bridge output circuit coupled across the other pair of opposed junction points of said elements, an amplifier having input and output electrodes, an alternating current connection between said bridge output circuit and said input electrodes for impressing an alternating current signal on said input electrodes representative of the unbalance of said bridge network, a direct current connection between said bridge output circuit and said input electrodes and including a rectifier for impressing a direct current bias voltage on said input electrodes, said bias voltage having such a magnitude in response to opening or short circuiting of one of the arms of said bridge network as to render said first amplifier inoperative, an electric motor, a first and a second electron tube, each having a cathode, a control grid and an anode, said motor being connected between said cathodes, means coupling said output electrodes to both of said control grids, a first and a second inductor, each having its terminals connected respectively to the anode of one said tubes and to the cathode of the other tube, means for impressing an alternating current on said inductors, means for applying alternating current and direct current bias voltages between the cathodes and control grids of said tubes, whereby said motor will rotate in a predetermined direction upon failure of said bridge network and whereby the phase of said signal with reference to that of the alternating current impressed on said anodes determines the direction of rotation of said motor, and means coupled to said motor for varying the temperature of said medium.

11. An electronic temperature control system comprising a first resistor, a second resistor and an impedance element connected to form a bridge network, manually operable means for adjusting the resistance of said first resistor, the resistance of said second resistor being responsive to the temperature of a medium to be controlled, means for applying an alternating current between the junction point of said resistors and the midpoint of said element, a bridge output circuit coupled across said element, an amplifier having input and output electrodes, an alternating current connection between said bridge output circuit and said input electrodes for impressing an alternating current signal on said input electrodes representative of the unbalance of said bridge network, a direct current connection between said bridge output circuit and said input electrodes and including a rectifier for impressing a direct current bias voltage on said input electrodes, said bias voltage having such a magnitude in response to opening or short circuiting of one of the arms of said bridge network as to render said amplifier inoperative, a direct current motor, a first and a second electron tube, each having a cathode, a control grid and an anode, said motor being connected between said cathodes, means coupling said output electrodes to both of said control grids, a pair of inductors, each having its terminals connected respectively to the anode of one of said tubes and to the cathode of the other tube, means for impressing an alternating current on said inductors in a sense to impress voltages on the anodes of said tubes which are out of phase, means for applying alternating current and direct current bias voltages on both of said cathodes, whereby said motor will rotate in a predetermined direction upon failure of said bridge network and whereby the phase of said signal with reference to that of the alternating current impressed on said inductors determines the direction of rotation of said motor, and means coupled to said motor for varying the temperature of said medium.

12. An electronic temperature control system comprising a first resistor, a second resistor and a first inductor connected to form a bridge network, manually operable means for adjusting the resistance of said first resistor, the resistance of said second resistor being responsive to the temperature of a medium to be controlled, means for applying an alternating current between the junction point of said resistors and the midpoint of said first inductor, a bridge output circuit coupled across said first inductor, an amplifier having input and output electrodes, an alternating current connection between said bridge output circuit and said input electrodes for impressing an alternating current signal on said input electrodes representative of the unbalance of said bridge network, a direct current connection between said bridge output circuit and said input electrodes and including a rectifier for impressing a direct current bias voltage on said input electrodes, said bias voltage having such a magnitude in response to opening or short circuiting of one of the arms of said bridge network as to render said amplifier inoperative, a direct current motor, a first and a second electron tube, each having a cathode, a control grid and an anode, said motor being connected between said cathodes, a first pair of resistors, each having one terminal connected to one of said control grids, means coupling said output electrodes to the other terminals of said first pair of resistors, a second and a third inductor, each having its terminals connected respectively to the anode of one of said tubes and to the cathode of the other tube, means for impressing an alternating current on said second and third inductors in a sense to impress voltages on the anodes of said tubes which are out of phase, a second pair of resistors connected serially between said cathodes, means for applying alternating current and direct current bias voltages to the junction point of said second pair of resistors, whereby said motor will rotate in a predetermined direction upon failure of said bridge network and whereby the phase of said signal with reference to that of the alternating current impressed on said second and third inductors determines the direction of rotation of said motor, and means coupled to said motor for varying the temperature of said medium.

13. An electronic temperature control system comprising a first resistor, a second resistor and a first inductor connected to form a bridge network, manually operable means for adjusting the resistance of said first resistor, the resistance of said second resistor being responsive to the temperature of a medium to be controlled, an alternating current source connected between the junction point of said resistors and the midpoint of said first inductor, a bridge output circuit coupled across said first inductor, a first and a second amplifier, each having input and output electrodes, said amplifiers being coupled in cascade, an alternating current connection between said bridge output circuit and the input electrodes of said first amplifier for impressing an alternating current signal on said input electrodes representative of the unbalance of said bridge network, a direct current connection between said bridge output circuit and the input electrodes of said first amplifier and including a rectifier for impressing a direct current bias voltage on said input electrodes, said bias voltage having such a magnitude in response to opening or short circuiting of one of the arms of said bridge network as to render said first amplifier inoperative, a direct current motor, a first and a second electron tube, each having a cathode, a control grid and an anode, said motor being connected between said cathodes, means coupling the output electrodes of said second amplifier to both of said control grids, a second and a third inductor, each having its terminals connected respectively to the anode of one of said tubes and to the cathode of the other tube, means coupled to said source for impressing an alternating current on said second and third inductors in a sense to impress voltages on the anodes of said tubes which are out of phase, means coupled to said source for developing a rectified voltage and applying it to said amplifier, means coupled to said last mentioned means and to said source for applying alternating current and direct current bias voltages on both of said cathodes, whereby said motor will rotate in a predetermined direction upon failure of said bridge network and whereby the phase of said signal with reference to that of the alternating current impressed on said second and third inductors determines the direction of rotation of said motor, and means coupled to said motor for varying the temperature of said medium.

14. An electronic temperature control system comprising a first resistor, a second resistor and a first inductor connected to form a bridge network, manually operable means for adjusting the resistance of said first resistor, the resistance of said second resistor being responsive to the temperature of a medium to be controlled, a source of alternating current connected between the junction point of said resistors and the midpoint of said first inductor, a bridge output circuit coupled across said first inductor, a first and a second amplifier, each having input and output electrodes, said amplifiers being connected in cascade, an alternating current connection between said bridge output circuit and the input electrodes of said first amplifier for impressing an alternating current signal on said input electrodes representative of the unbalance of said bridge network, a direct current connection between said bridge output circuit and the input electrodes of said first amplifier and including a rectifier for impressing a direct current bias voltage on said input electrodes, said bias voltage having such a magnitude in response to opening or short circuiting of one of the arms of said bridge network as to render said first amplifier inoperative, a direct current motor, a first and a second electron tube, each having a cathode, a control grid and an anode, said motor being connected between said cathodes, a pair of resistors serially connected between said cathodes, means coupling the output electrodes of said second amplifier to both of said control grids, a second and a third inductor, each having its terminals connected respectively to the anode of one of said tubes and to the cathode of the other tube, means coupled to said source for impressing an alternating current on said second and third inductors in a sense to impress voltages on the anodes of said tubes which are out of phase, a rectifier circuit coupled to said source and having a first and a second filter network connected in cascade to the output thereof, means for applying the voltage developed from said second filter network to said first amplifier and for applying the voltage developed from said first filter network to said second amplifier, means coupled to said source and to said first filter network for developing alternating current and direct current bias voltages and impressing them on both of said cathodes, whereby said motor will rotate in a predetermined direction upon failure of said bridge network and whereby the phase of said signal with reference to that of the alternating current impressed on said second and third inductors determines the direction of rotation of said motor, and means coupled to said motor for varying the temperature of said medium.

References Cited in the file of this patent

UNITED STATES PATENTS

| | | |
|---|---|---|
| 2,518,108 | York | Aug. 8, 1950 |
| 2,527,718 | Grass | Oct. 31, 1950 |
| 2,535,133 | Hoch | Dec. 26, 1950 |
| 2,586,319 | Foote | Feb. 19, 1952 |
| 2,619,595 | Russell | Nov. 25, 1952 |
| 2,654,837 | Oberman | Oct. 6, 1953 |

OTHER REFERENCES

Electronic Instruments by Greenwood, Holdam and Macrae, published by McGraw-Hill Book Company, 1948, First Edition, pp. 411, 412, 413.